(12) United States Patent
May et al.

(10) Patent No.: US 10,094,181 B2
(45) Date of Patent: Oct. 9, 2018

(54) FLUID LOSS ADDITIVE PACKAGE FOR SHALLOW WELL DRILLING FLUIDS

(71) Applicant: Halliburton Energy Services, Inc., Houston, TX (US)

(72) Inventors: Preston Andrew May, Splendora, TX (US); Ryan Patrick Collins, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/517,061

(22) PCT Filed: Nov. 7, 2014

(86) PCT No.: PCT/US2014/064642
§ 371 (c)(1),
(2) Date: Apr. 5, 2017

(87) PCT Pub. No.: WO2016/073004
PCT Pub. Date: May 12, 2016

(65) Prior Publication Data
US 2017/0247596 A1    Aug. 31, 2017

(51) Int. Cl.
| | | |
|---|---|---|
| *E21B 21/00* | (2006.01) | |
| *C09K 8/10* | (2006.01) | |
| *C09K 8/508* | (2006.01) | |
| *C09K 8/514* | (2006.01) | |
| *C09K 8/035* | (2006.01) | |

(52) U.S. Cl.
CPC ............ *E21B 21/003* (2013.01); *C09K 8/035* (2013.01); *C09K 8/10* (2013.01); *C09K 8/508* (2013.01); *C09K 8/514* (2013.01)

(58) Field of Classification Search
None
See application file for complete search history.

(56) References Cited

U.S. PATENT DOCUMENTS

| 3,897,836 A * | 8/1975 | Hall ........................ E21B 4/00 175/424 |
|---|---|---|
| 4,182,417 A | 1/1980 | McDonald et al. |
| 4,282,928 A | 8/1981 | McDonald et al. |
| 4,635,726 A | 1/1987 | Walker |
| 6,581,701 B2 | 6/2003 | Heying |
| 7,163,969 B2 | 1/2007 | Ahmed et al. |
| 8,685,900 B2 | 4/2014 | Ezell et al. |

(Continued)

FOREIGN PATENT DOCUMENTS

| WO | 2010112866 A1 | 10/2010 |
|---|---|---|
| WO | 2014014631 A1 | 1/2014 |

OTHER PUBLICATIONS

International Search Report and Written Opinion dated Jul. 21, 2015; International PCT Application No. PCT/US2014/064642.

*Primary Examiner* — Anuradha Ahuja
(74) *Attorney, Agent, or Firm* — McGuireWoods LLP

(57) ABSTRACT

A wellbore treatment fluid comprising: a base fluid; and a fluid loss additive package, the fluid loss additive package comprising: a water-swellable, superabsorbent polymer; a derivatized cellulose; and non-swellable particles that are insoluble in the base fluid. A method of drilling a wellbore into a subterranean formation comprising: providing the drilling fluid; and forming the wellbore using a drill bit and the drilling fluid.

20 Claims, 5 Drawing Sheets

(56) References Cited

U.S. PATENT DOCUMENTS

| | | |
|---|---|---|
| 8,697,609 B2 | 4/2014 | Ezell et al. |
| 2002/0039869 A1* | 4/2002 | Achille ................. A61L 15/225 |
| | | 442/417 |
| 2002/0169085 A1 | 11/2002 | Miller et al. |
| 2006/0086501 A1* | 4/2006 | Creel ...................... C04B 28/26 |
| | | 166/281 |
| 2006/0213662 A1 | 9/2006 | Creel et al. |
| 2008/0108524 A1* | 5/2008 | Willberg ................ C09K 8/035 |
| | | 507/225 |
| 2008/0125334 A1 | 5/2008 | Burns et al. |
| 2010/0126723 A1 | 5/2010 | Ali et al. |
| 2011/0168393 A1 | 7/2011 | Ezell et al. |
| 2012/0231980 A1* | 9/2012 | Zhang .................... C09K 8/035 |
| | | 507/206 |
| 2013/0000900 A1* | 1/2013 | Kalgaonkar ........... C09K 8/035 |
| | | 166/279 |
| 2014/0024561 A1 | 1/2014 | Reddy |
| 2014/0060843 A1* | 3/2014 | Murphy .................. C09K 8/03 |
| | | 166/310 |

\* cited by examiner

FLUID LOSS ADDITIVE PACKAGE FOR SHALLOW WELL DRILLING FLUIDS

TECHNICAL FIELD

A variety of additives can be used to combat fluid loss of a drilling fluid into a subterranean formation. The fluid loss additives can be included in the fluid and function to prevent some or all of the base fluid from undesirably flowing into the formation. The fluid loss additives can form a filtercake on the wall of a wellbore. The filtercake can later be removed with a breaker or other mechanisms.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION OF THE INVENTION

Figure 1:
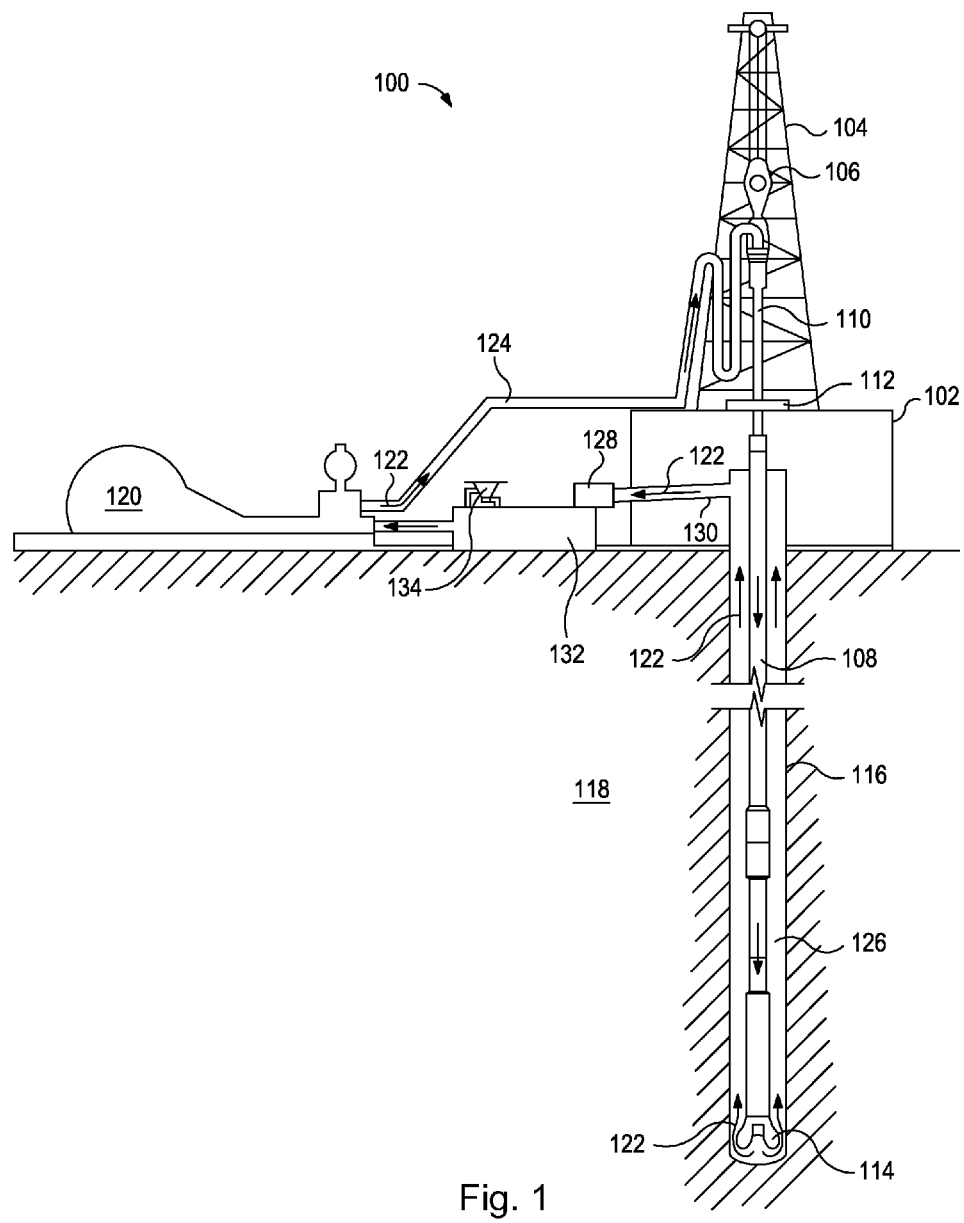
FIG. 1 is a diagram illustrating a well system according to certain embodiments.

Oil and gas hydrocarbons are naturally occurring in some subterranean formations. In the oil and gas industry, a subterranean formation containing oil and/or gas is referred to as a reservoir. A reservoir can be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

As used herein, a "fluid" is a substance having a continuous phase that can flow and conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A heterogeneous fluid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. As used herein, the term "base fluid" means the solvent of a solution or the continuous phase of a heterogeneous fluid and is the liquid that is in the greatest percentage by volume of a treatment fluid.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet radially of the wellbore. As used herein, "into a well" means and includes into any portion of the well, including into the wellbore or into the near-wellbore region via the wellbore.

A portion of a wellbore can be an open hole or cased hole. In an open-hole wellbore portion, a tubing string can be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

A wellbore is formed using a drill bit. A drill string can be used to aid the drill bit in drilling through a subterranean formation to form the wellbore. The drill string can include a drilling pipe. During drilling operations, a drilling fluid, sometimes referred to as a drilling mud, may be circulated downwardly through the drilling pipe and back up the annulus between the wellbore and the outside of the drilling pipe. The drilling fluid performs various functions, such as cooling the drill bit, maintaining the desired pressure in the well, and carrying drill cuttings upwardly through the annulus between the wellbore and the drilling pipe.

Additives can be used in a drilling fluid. If the permeability of the subterranean formation is great enough, then some or all of the base fluid of a drilling fluid can undesirably penetrate into the subterranean formation instead of being circulated back towards the wellhead. This is known as fluid loss. The larger the pore sizes and interconnectivity of the pores, the greater the volume of base fluid that can be lost into the formation. Fluid loss additives can be used in a drilling fluid to help inhibit or prevent fluid loss.

The fluid loss additives can form a filtercake on the wall of the wellbore. A filtercake is the residue deposited on a permeable medium when a slurry, such as a drilling fluid, is forced against the medium under pressure. The filtrate is the liquid that passes through the medium, leaving the cake on the medium. In filtercake deposition, the slurry, that commonly includes water, a gelling agent, calcium carbonate, and polymers, is introduced into the open-hole wellbore. The fluid flows into a desired portion of the well. The ingredients in the fluid form the filtercake. The filtercake can be used to bind fines, such as sand, together, can also reduce damage to formation permeability, and can also stabilize the wellbore.

Shallow wells, for example horizontal wellbores, wellbores drilled to produce water, and drill shafts used to insert support structures for bridges, can be governed by unique environmental regulations for the drilling fluids. The additives used in the drilling fluids used for these types of wellbores may need to be non-biodegradable due to the possibility that the drilling fluid could penetrate a water table used for drinking water. In these instances, if the additives are biodegradable, then microbial growth could take place as the additives biodegrade, thus causing contamination to the drinking water.

It is often desirable to remove at least a portion of a filtercake after deposition onto the wellbore wall. The filtercake is often removed in order to restore fluid flow between the wellbore and the subterranean formation. A breaker for the filtercake can be used to remove the filtercake and restore fluid communication.

Some types of clay, such as bentonite clay, have been used as a fluid loss additive in drilling fluids. Bentonite clay can be considered to create the benchmark for effective fluid loss control due to its ability to plug larger-sized pores in a subterranean formation. However, some of the drawbacks to using some types of clay are that the clays can cause damage to the subterranean formation and can be very difficult to remove. As a result, other fluid loss additives have been used to try and replace some types of clay. Unfortunately, most alternatives, such as polymer additives, have been unable to perform as well as some types of clay. Therefore, there is a need and an ongoing industry-wide concern for improved non-biodegradable fluid loss additives that can be used to replace clay fluid loss additives.

It has unexpectedly been discovered that a fluid loss additive package of at least three different ingredients can be used as a fluid loss additive. The additive package can include a superabsorbent polymer (SAP), a modified cellulose, and silica particles. It was previously thought that a polymeric fluid loss additive would be incapable of providing as good, if not better fluid loss control compared to other fluid loss additives, such as bentonite clay.

A polymer is a large molecule composed of repeating units, typically connected by covalent chemical bonds. A polymer is formed from monomers. During the formation of the polymer, some chemical groups can be lost from each monomer. The piece of the monomer that is incorporated into the polymer is known as the repeating unit or monomer residue. The backbone of the polymer is the continuous link between the monomer residues. The polymer can also contain functional groups connected to the backbone at various locations along the backbone. Polymer nomenclature is generally based upon the type of monomer residues comprising the polymer. A polymer formed from one type of monomer residue is called a homopolymer. A copolymer is formed from two or more different types of monomer residues. The number of repeating units of a polymer is referred to as the chain length of the polymer. The number of repeating units of a polymer can range from approximately 11 to greater than 10,000. In a copolymer, the repeating units from each of the monomer residues can be arranged in various manners along the polymer chain. For example, the repeating units can be random, alternating, periodic, or block. The conditions of the polymerization reaction can be adjusted to help control the average number of repeating units (the average chain length) of the polymer.

A polymer has an average molecular weight, which is directly related to the average chain length of the polymer. The average molecular weight of a polymer has an impact on some of the physical characteristics of a polymer, for example, its solubility and its dispersibility. For a copolymer, each of the monomers will be repeated a certain number of times (number of repeating units). The average molecular weight ($M_w$) for a copolymer can be expressed as follows:

$$M_w = \Sigma w_x M_x$$

where $w_x$ is the weight fraction of molecules whose weight is $M_x$.

If any laboratory test (e.g., rheology or fluid loss) requires the step of mixing, then the drilling fluid is mixed according to the following procedures. A known volume (in units of barrels) of the aqueous liquid is added to a Lightnin' mixing container equipped with a Teflon® blade and the container is then placed on a mixer base. The motor of the base is then turned on and maintained at 700 revolutions per minute (rpm). The ingredients are then added to the aqueous liquid and mixed for at least 20 minutes. The ingredients can be added at a stated concentration of weight by volume of the drilling fluid, for example, in units of pounds per barrel of the drilling fluid. It is to be understood that any mixing is performed at ambient temperature and pressure—about 71° F. (22° C.) and about 1 atm (0.1 MPa).

A drilling fluid should exhibit good rheology. Rheology is a measure of how a material deforms and flows. As used herein, the "rheology" of a drilling fluid is measured according to ANSI/API 13B-1 section 6.3, Recommended Practice for Field Testing of Water-based Drilling Fluids as follows. The drilling fluid is mixed. The drilling fluid is placed into the test cell of a rotational viscometer, such as a FANN® Model 35 viscometer, fitted with a R1-B1-F1 rotor-bob-torsion spring combination. The drilling fluid is tested at the specified temperature and ambient pressure, about 1 atm (0.1 MPa). Rheology readings are taken at multiple revolutions per minute "rpm," for example, at 3, 6, 100, 200, 300, and 600.

Viscosity is a measure of how resistant a material is to shear forces and to flow freely. A viscous material (e.g., honey) resists flow; while a less viscous material (e.g., freshwater) flows freely. Viscosity can be measured using the 600 rpm reading from the rheology readings. "Apparent viscosity" is the 600 rpm dial reading divided by 2 and reported in units of cP.

As used herein, the "plastic viscosity" of a drilling fluid is obtained from the Bingham-Plastic rheological model and calculated as the difference between the 600 rpm and 300 rpm dial readings from the rheology testing, expressed in units of cP.

The yield point ("YP") is defined as the value obtained from the Bingham-Plastic rheological model when extrapolated to a shear rate of zero. As used herein, the "yield point" of a drilling fluid is calculated as the difference between the plastic viscosity and the 300 rpm dial reading, expressed in units of lb/100 ft$^2$. To convert the units to Pa, the difference is multiplied by 0.48. Similarly, the yield stress or Tau zero is the stress that must be applied to a material to make it begin to flow (or yield), and may commonly be calculated from rheometer readings measured at rates of 3, 6, 100, 200, 300 and 600 rpm. The extrapolation in this case may be performed by applying a least-squares fit or curve fit to the Herchel-Bulkley rheological model.

A fluid can develop gel strength. As used herein, the "10 s gel strength" of a drilling fluid is measured according to ANSI/API 13B-1 section 6.3, Recommended Practice for Field Testing of Water-based Drilling Fluids as follows. After the rheology testing of the substance is performed, the substance is allowed to sit in the test cell for 10 seconds (s). The motor of the viscometer is then started at 3 rpm. The maximum deflection on the dial reading is the gel strength at 10 s in units of lb/100 ft$^2$. As used herein, the "10 min gel strength" is measured as follows. After the initial gel strength test has been performed, the substance is allowed to sit in the test cell for 10 minutes (min). The motor of the viscometer is then started at 3 rpm. The maximum deflection on the dial reading is the gel strength at 10 min in units of lb/100 ft². To convert the units to Pascal (Pa), the dial readings are multiplied by 0.511.

Another desirable property of a drilling fluid is low fluid loss. As used herein, the "API fluid loss" of a drilling fluid is tested according to ANSI/API 13B-1, Fourth edition, section 7.2, Recommended Practice for Field Testing of Water-based Drilling Fluids procedure at a specified temperature and pressure differential as follows. The drilling fluid is mixed. The drilling fluid is stirred for 5 min using a multi-mixer. The drilling fluid is poured into the filter cell. The testing apparatus is assembled with a filter paper inserted into the apparatus. The specified pressure differential is set. A timer is started and filtrate out of the testing apparatus is collected in a separate volumetric container. The testing is performed for 30 min. The total volume of filtrate collected is read. Fluid loss is measured in milliliters (mL) of fluid collected in 30 min.

Sand can also be used to simulate a formation and the amount of fluid loss into the formation. As used herein, the "fluid loss" of a drilling fluid is tested at a specified temperature and pressure differential as follows. The drilling fluid is mixed. 150 g of 50/70 mesh sand was weighed out and added to a filter cell containing only the metal screen without filter paper. Water was added to the sand and allowed to filter through while the sand was agitated and then allowed to settle to produce an even layer of sand. All of the free water was filtered through the sand and the drilling test fluid was introduced gently so as to not disturb the sand. The filter cell was then sealed. The filter cell was pressurized to 100 psi at a temperature of 70° F. (21° C.) and a timer was started. The filtrate through the sand was collected for 30 minutes. After 30 minutes, the filtrate was gently poured back into the filter cell, the filter cell was sealed again, and another 30 minutes of filtrate was collected. If an effective filter cake had been formed in the first 30 minutes (labeled 0-30 min), then the second 30 minute filtrate (labeled 30-60 min) should be low. If no filter cake is established, both the 0-30 min and 30-60 min filtrates should be the same.

According to certain embodiments, a wellbore treatment fluid comprises: a base fluid; and a fluid loss additive package, the fluid loss additive package comprising: a water-swellable, superabsorbent polymer; a derivatized cellulose; and non-swellable particles that are insoluble in the base fluid.

According to certain other embodiments, a method of drilling a wellbore into a subterranean formation comprises: providing the drilling fluid; and forming the wellbore using a drill bit and the drilling fluid.

It is to be understood that the discussion of preferred embodiments regarding the drilling fluid or any ingredient in the drilling fluid (e.g., the fluid loss additives) are intended to apply to the method, drilling fluid, and system embodiments. Any reference to the unit "gallons" means U.S. gallons.

The drilling fluid includes a base fluid. The drilling fluid can be a heterogeneous fluid, wherein the base fluid is the continuous phase. Any of the phases of a heterogeneous fluid can include dissolved substances or undissolved solids. The base fluid can include water. The water can be selected from the group consisting of freshwater or brackish water. According to certain embodiments, the base fluid and the drilling fluid do not include a water-soluble salt and the base fluid is not a brine. These embodiments are useful to provide the superabsorbent polymer with a maximum swelling capability (discussed below).

The drilling fluid can be used to create a wellbore for wellbore operations or for the construction industry. For example, the wellbore operations can be for production of water (i.e., a water well), horizontal directional drilling, tunneling, ground source geothermal heat loops, or minerals exploration. The wellbore can also be a drilled shaft for anchoring structural supports, for example for bridges. According to certain embodiments, the wellbore is a shallow well, which is a well that generally extends no more than about 2,000 feet into the subterranean formation. The well can also have a possible interaction with drinking water. Preferably, the additives for the drilling fluid are not biodegradable. As such, there is no risk of microbial growth in a drinking water supply due to the biodegradation of the additives. According to certain other embodiments, the wellbore is not a hydrocarbon producing well. The wellbore can be created using common drilling equipment, such as a drill string and a drill bit-along with the drilling fluid. The drilling fluid can help stabilize the wellbore as it is being formed.

The drilling fluid can have a density less than or equal to 9 pounds per gallon "ppg" (1.08 kilograms per liter "kg/L"). According to certain embodiments, the drilling fluid does not contain a weighting agent. The drilling fluid can include drilled solids from the subterranean formation during the formation of the wellbore, in which case, the density of the drilling fluid can increase during drilling.

The drilling fluid also includes a fluid loss additive package. One of the advantages to the fluid loss additive package is that it can provide excellent reduction in fluid loss even though the subterranean formation has a variety of pore sizes. By way of example, the subterranean formation can have pore sizes from about 5 micrometers (µm) all the way up to 50 centimeters (cm) and the amount of fluid loss into the formation can still be controlled or even eliminated.

The fluid loss additive package includes a water-swellable, superabsorbent polymer (SAP). As used herein, the term "water swellable" means that the polymer can imbibe water into the polymer molecule or network of cross-linked polymer molecules and experience an increase in volume as a result. As used herein, the term "superabsorbent" means that the polymer can swell and increase up to 1,000 times its original volume when fully hydrated with water. The superabsorbent polymer is preferably insoluble in the base fluid.

The superabsorbent polymer (SAP) can be in a dry form prior to contact with water. The SAP can be in the form of particles. The SAP can have a variety of particle sizes. According to certain embodiments, at least 90% of the SAP particles have a particle size less than about 75 µm prior to contact with water (i.e., in dry form). At least 90% of the SAP particles can also have a particle size less than about 600 µm after becoming fully hydrated and swollen. Preferably the drilling fluid is in a pumpable state during the formation of the wellbore. According to these embodiments, the superabsorbent polymer has a dry form particle size and a fully hydrated particle size such that the drilling fluid is in the pumpable state. In other words, if the dry SAP particles are too large, then the swelled SAP particles may be too large and inhibit or prevent pumping of the fluid. As such the particles sizes can be selected to ensure a pumpable fluid.

Other water-swellable polymers that are not superabsorbent do not generally swell as much or have as large a volume increase as SAPs. Other water-swellable polymers, which are classified as hydrogels when cross-linked, absorb aqueous solutions through hydrogen bonding with water molecules. By contrast, SAP's ability to absorb water is a factor of the ionic concentration of the aqueous solution. In deionized and distilled water, SAPs may absorb 500 times its weight (from 30 to 1,000 times its own volume) and can become up to 99.9% liquid, but when put into a 0.9% saline solution, the absorbency drops to may be 50 times its weight. The presence of valence cations in the solution impedes the polymer's ability to bond with the water molecule. Therefore, it is preferred that the base fluid and the drilling fluid do not contain water-soluble salts or other compounds that can impede the swelling capability of the superabsorbent polymer. The limitation of other water-swellable polymers means that a higher concentration of these other non-superabsorbent polymers and a larger particle size may be needed in order to achieve the same fluid loss properties as SAPs. However, this can lead to density issues due to the increased concentration and/or particle size.

Moreover, the swelling capacity of superabsorbent polymers is also a result of the amount of cross-linking of the polymer molecules and the resulting density of the polymer networks. Low-density, cross-linked SAPs generally have a higher absorbent capacity and swell to a larger degree. These types of SAPs also have a softer and stickier gel formation. High-density, cross-linked SAPs exhibit a lower absorbent capacity and swell, but the gel strength is firmer and can maintain particle shape even under modest pressure. The amount of cross-linking and density of the polymer networks formed can be controlled to provide a desired fluid loss and viscosity to the drilling fluid.

Due to the inherent ability to have substantial increases in volume after contact with water, the superabsorbent polymer can block larger pores within the subterranean formation by bridging across the pore openings and possibly contributing to the formation of a filtercake. The superabsorbent polymer molecules can also form a polymer network due to cross-linking of the polymer molecules. According to certain embodiments, the superabsorbent polymer is in a sufficient concentration to provide a desirable fluid loss for the drilling fluid. The superabsorbent polymer can also be in a concentration of at least 0.2 pounds per barrel "lb/bbl" (0.8 kilograms per cubic meter "kg/m$^3$" of the base fluid. The superabsorbent polymer can also be in a concentration in the range of about 0.2 to about 5 lb/bbl (about 0.8 to about 19 kg/m$^3$) of the base fluid or about 0.5 to about 3 lb/bbl (about 2 to about 12 kg/m$^3$) of the base fluid.

The superabsorbent polymer can be selected from: a cross-linked homopolymer of acrylic acid or acrylate, acrylamide, ethylene, maleic anhydride, methacrylic acid, vinyl acetate, vinyl alcohol, acrylonitrile, hydroxyethylmethacrylate, carboxymethylcellulose, ethylene oxide, propylene oxide, vinylpyrrolidone, or styrenesulfonate; and copolymers of any of the foregoing monomers. By way of example, the SAP can be a copolymer made from acrylic acid and sodium hydroxide in the presence of an initiator to form a poly-acrylic acid sodium salt, a polyethylene oxide/polypropylene oxide copolymer, or a starch grafted copolymer of polyacrylonitrile.

The superabsorbent polymer can also form a gel. A "gel" refers to a substance that does not easily flow and in which shearing stresses below a certain finite value fail to produce permanent deformation. A substance can develop gel strength. The higher the gel strength, the more likely the substance will become a gel. Conversely, the lower the gel strength, the more likely the substance will remain in a fluid state. Although there is not a specific dividing line for determining whether a substance is a gel, generally, a substance with a 10 minute gel strength greater than 30 lb/100 ft$^2$ (1,436 Pa) will become a gel. Alternatively, generally, a substance with a 10 minute gel strength less than 30 lb/100 ft$^2$ (1,436 Pa) will remain in a fluid state. A flat gel indicates that the gelation of the substance is not gaining much strength with time; whereas, a progressive gel indicates that the gelation of the substance is rapidly gaining strength with time. A gel can be a fragile gel. A fragile gel is a fluid that acts like a gel when allowed to remain static for a period of time (i.e., no external force is applied to the fluid) thus exhibiting good suspending properties, but can be broken into a liquid or pumpable state by applying a force to the fluid. Conversely, a progressive gel may not be breakable, or a much higher force may be required to break the gel. The drilling fluid can be a fragile gel.

The fluid loss additive package also includes a derivatized cellulose. The derivatized cellulose can be for example, hydroxyethyl cellulose (HEC), alkyl hydroxyethyl cellulose, cellulose derivatized with alkyl ethers (including methyl ethers, ethyl ethers, etc.), and cellulose derivatized with polyethylene glycol or propylene glycol substituents attached to the cellulose backbone. The molecular weight of the derivatized cellulose can have an effect on the viscosity of the drilling fluid. By way of example, the derivatized cellulose can be a low molecular weight polymer (i.e., a molecular weight less than about 100,000) such that the derivatized cellulose does not add any appreciable viscosity to the drilling fluid. However, the derivatized cellulose can have a high molecular weight. According to this embodiment, a viscosity-reducing additive may need to be included in the drilling fluid to create a pumpable fluid.

The derivatized cellulose can be in a concentration to provide a desired fluid loss to the drilling fluid. The derivatized cellulose can also be in a concentration of at least 0.5 lb/bbl (2 kg/m$^3$) of the drilling fluid. The derivatized cellulose can also be in a concentration in the range of about 0.5 to about 5 lb/bbl (about 2 to about 19 kg/m$^3$) of the drilling fluid.

The fluid loss additive package also includes non-swellable particles that are insoluble in the base fluid. The particles can be naturally-occurring or synthetic, preferably chemically inert, and can also be non-biodegradable. The particles can be bulk particles, mesoscopic particles, or combinations thereof. As used herein, a "bulk particle" is a particle having a particle size greater than 1 micron. As used herein, a "mesoscopic particle" is a particle having a particle size in the range of 1 micron to 0.1 micron. As used herein, the term "particle size" refers to the volume surface mean diameter ("$D_s$"), which is related to the specific surface area of the particle. The volume surface mean diameter may be defined by the following equation: $D_s=6/(\Phi_s A_w \rho_p)$, where $\Phi_s$=sphericity; $A_w$=specific surface area; and $\rho_p$=particle density. The particles can be selected from the group consisting of silica particles, alumina particles, glass micro-particles and microspheres, ceramic micro-particles and microspheres, sized calcium carbonate, and combinations thereof.

The particles can be in a concentration to provide a desired fluid loss to the drilling fluid. The particles can also be in a concentration of at least 0.5 lb/bbl (2 kg/m$^3$) of the drilling fluid. The particles can also be in a concentration in the range of about 0.5 to about 5 lb/bbl (about 2 to about 19 kg/m$^3$) of the drilling fluid.

The derivatized cellulose and the particles can work in tandem to provide blockage to smaller pores in the subterranean formation. In this manner, the complete additive package substantially decreases or prevents fluid loss regardless of the pore sizes of the formation.

According to certain embodiments, the drilling fluid does not contain a clay. Clays can cause formation damage and can be difficult to remove from the subterranean formation. A breaker can be introduced into the wellbore after the wellbore has been drilled with the drill bit and drilling fluid. The breaker can be used to remove some or all of a filtercake or residue formed from the fluid loss additive package of the drilling fluid. By way of example, a breaker can break the cross-links or backbone of the superabsorbent polymer molecules to create smaller polymer fragments. The smaller polymer fragments can be flowed from the wellbore and removed from the subterranean formation. The breaker can also break the derivatized cellulose into smaller fragments. The breaker can also reduce the viscosity of the fluid without necessarily breaking any chemical bonds. The reduced viscosity allows the filtercake to be removed from the wellbore. The breaker can be selected from the group consisting of: hypochlorites such as sodium hypochlorite, calcium hypochlorite, lithium hypochlorite, and barium hypochlorite; salts such as sodium chloride, potassium chloride, calcium chloride, and magnesium chloride; and peroxides such as hydrogen peroxide, calcium peroxide, magnesium peroxide, and zinc peroxide; and combinations thereof.

The drilling fluid can have an API fluid loss less than 30 milliliters (mL) in 30 minutes (min) at a pressure differential of 100 psi. The drilling fluid can also have a fluid loss less than 15 mL/30 min at a pressure differential of 100 psi.

The drilling fluid can have a viscosity less than or equal to a viscosity necessary to provide a pumpable fluid. The drilling fluid can also have an apparent viscosity less than 60 cP or less than 50 cP. The drilling fluid can also have a plastic viscosity less than 60 cP or less than 50 cP. The drilling fluid can also have a yield point less than 50 lb/100 ft$^2$ or less than 30 lb/100 ft$^2$. The drilling fluid can also have a 10 min gel strength less than 30 lb/100 ft$^2$ or less than 20 lb/100 ft$^2$.

The drilling fluid can further include other additives. Examples of additives include, but are not limited to, a shale or clay stabilizer, a viscosifier, a viscosity-reducing agent, a friction reducer, a defoaming agent, elastomers, a mechanical property enhancing additive, a gas migration control additive, a thixotropic additive, and combinations thereof. An example of a suitable shale stabilizer, which also functions to increase the viscosity, is partially-hydrolyzed polyacrylamide (PHPA). The PHPA can be in a concentration in the range of about 0.01 to about 1 lb/bbl (about 0.04 to about 4 kg/m$^3$) of the drilling fluid.

The methods include providing the drilling fluid. The methods can further include forming the drilling fluid. The step of forming can include mixing the ingredients of the drilling fluid together using a suitable mixing apparatus. The drilling fluid can be in a pumpable state.

The methods can further include introducing a cement composition into the well, wherein the step of introducing the cement composition is performed after the step of forming the wellbore. As used herein, a "cement composition" is a mixture of at least cement and water, and possibly additives. As used herein, the term "cement" means an initially dry substance that, in the presence of water, acts as a binder to bind other materials together. An example of cement is Portland cement. The step of introducing the cement composition can be for the purpose of at least one of the following: anchoring structural supports for construction projects; well completion; foam cementing; primary or secondary cementing operations; well-plugging; and gravel packing. The cement composition can be in a pumpable state before and during introduction into the well.

The exemplary fluids disclosed herein can directly or indirectly affect one or more components or pieces of equipment associated with the preparation, delivery, recapture, recycling, reuse, and/or disposal of the disclosed fluids. For example, and with reference to FIG. 1, the disclosed fluids can directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 can include a drilling platform 102 that supports a derrick 104 having a traveling block 106 for raising and lowering a drill string 108. The drill string 108 can include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the disclosure.

One or more of the disclosed fluids can be added to the drilling fluid 122 via a mixing hopper 134 communicably coupled to or otherwise in fluid communication with the retention pit 132. The mixing hopper 134 can include, but is not limited to, mixers and related mixing equipment known to those skilled in the art. In other embodiments; however, the disclosed fluids can be added to the drilling fluid 122 at any other location in the drilling assembly 100. In at least one embodiment, for example, there could be more than one retention pit 132, such as multiple retention pits 132 in series. Moreover, the retention pit 132 can be representative of one or more fluid storage facilities and/or units where the disclosed fluids can be stored, reconditioned, and/or regulated until added to the drilling fluid 122.

As mentioned above, the disclosed fluids can directly or indirectly affect the components and equipment of the drilling assembly 100. For example, the disclosed fluids can directly or indirectly affect the fluid processing unit(s) 128 which can include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the exemplary fluids.

The disclosed fluids can directly or indirectly affect the pump 120, which representatively includes any conduits, pipelines, trucks, tubulars, and/or pipes used to fluidically convey the fluids downhole, any pumps, compressors, or motors (e.g., topside or downhole) used to drive the fluids into motion, any valves or related joints used to regulate the pressure or flow rate of the fluids, and any sensors (i.e., pressure, temperature, flow rate, etc.), gauges, and/or combinations thereof, and the like. The disclosed fluids can also directly or indirectly affect the mixing hopper 134 and the retention pit 132 and their assorted variations.

The disclosed fluids can also directly or indirectly affect the various downhole equipment and tools that can come into contact with the fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed fluids can also directly or indirectly affect any downhole heat exchangers, valves and corresponding actuation devices, tool seals, packers and other wellbore isolation devices or components, and the like associated with the wellbore 116. The disclosed fluids can also directly or indirectly affect the drill bit 114, which can include, but is not limited to, roller cone bits, PDC bits, natural diamond bits, any hole openers, reamers, coring bits, etc.

While not specifically illustrated herein, the disclosed fluids can also directly or indirectly affect any transport or delivery equipment used to convey the fluids to the drilling assembly 100 such as, for example, any transport vessels, conduits, pipelines, trucks, tubulars, and/or pipes used to fluidically move the fluids from one location to another, any pumps, compressors, or motors used to drive the fluids into motion, any valves or related joints used to regulate the pressure or flow rate of the fluids, and any sensors (i.e., pressure and temperature), gauges, and/or combinations thereof, and the like.

EXAMPLES

To facilitate a better understanding of the present invention, the following examples of certain aspects of preferred embodiments are given. The following examples are not the only examples that could be given according to the present invention and are not intended to limit the scope of the invention.

For Tables 1-4 and FIGS. 2-5, several drilling fluids were prepared and tested according to the procedure for the specific test in the Detailed Description above. The drilling fluids could contain the following ingredients: water; POLY-BORE™ high molecular weight partially-hydrolyzed polyacrylamide viscosifier and shale stabilizer; hydroxyethyl cellulose "HEC"; SSA-1™ silica particles; and cross-linked sodium polyacrylate as the superabsorbent polymer "SAP" having a particle size of less than about 44 μm.

Rheology, apparent viscosity, plastic viscosity, yield point, 10 s and 10 min gel strengths, and API fluid loss were conducted at a temperature of 71° F. (22° C.). API fluid loss was performed at a pressure differential of 100 pounds force per square inch "psi."

Table 1 shows various high shear and low shear mixing regime testing data for mixing of a drilling fluid containing the following ingredients: 350 mL of deionized water; POLY-BORE™ viscosifier at a concentration of 0.42 pounds per barrel "lb/bbl" (1.6 kilograms per cubic meter "kg/m$^3$"); hydroxyethyl cellulose "HEC" at a concentration of 1.25 lb/bbl (4.8 kg/m$^3$); SSA-1™ silica particles at a concentration of 1 lb/bbl (3.9 kg/m$^3$); and SAP at a concentration of 1 lb/bbl (3.9 kg/m$^3$). The "additional hydration time" was the amount of time that the additive package of the hydroxyethyl cellulose "HEC", SAP, and silica particles were allowed to hydrate with the water.

As can be seen in Table 1, the fluid mixed under high shear was not significantly degraded or otherwise adversely affected by the high shear. This indicates that the drilling fluid is in a pumpable state and is can be pumped at a high shear rate without causing damage to the fluid.

TABLE 1

| | Mixing Instrument | | | |
| --- | --- | --- | --- | --- |
| | Lightnin' Mixer | | Hamilton MultiMixer | |
| Mixing Strategy | Adequate dispersion with low shear | High shear | High shear | High shear followed by hydration time |
| Mixing Time (min) | 20 | 5 | 20 | 5 |
| Additional Hydration Time (min) | 0 | 0 | 0 | 30 |
| 600 rpm | 87 | 76 | 77 | 88 |
| 300 rpm | 51 | 48 | 54 | 52 |
| 200 rpm | 42 | 38 | 44 | 45 |
| 100 rpm | 31 | 26 | 30 | 30 |
| 6 rpm | 8 | 8 | 10 | 10 |
| 3 rpm | 7 | 7 | 7 | 8 |
| Apparent Viscosity (cP) | 44 | 38 | 39 | 44 |
| Plastic Viscosity (cP) | 36 | 28 | 23 | 36 |
| Yield Point (lb/100 ft$^2$) | 15 | 20 | 31 | 16 |
| 10 s. Gel Strength (lb/100 ft$^2$) | 9 | 9 | 9 | 10 |
| 10 min. Gel Strength (lb/100 ft$^2$) | 17 | 13 | 11 | 12 |
| API Fluid Loss (mL) | 12 | 15 | 14 | 16 |

Table 2 lists the concentration of ingredients and testing data for 5 different drilling fluids. As can be seen, as the concentration of the fluid loss additive package decreases, the viscosity of the drilling fluid also decreases. Moreover, as the concentration of the fluid loss additive package decreases, the API fluid loss increases. However, the rheology, viscosities, gel strengths and API fluid loss are still acceptable values even at very low concentrations of the fluid loss additive package. This indicates that the fluid loss additive package functions very effectively at providing exceptional fluid loss control and excellent fluid properties even at low concentrations.

TABLE 2

| Drilling Fluid # | 1 | 2 | 3 | 4 | 5 |
| --- | --- | --- | --- | --- | --- |
| Deionized Water (mL) | 350 | 350 | 350 | 350 | 350 |
| POLY-BORE ™ (lb/bbl) | 0.42 | 0.3675 | 0.315 | 0.21 | 0.105 |
| HEC (lb/bbl) | 1.25 | 1.09 | 0.94 | 0.625 | 0.3125 |
| SSA-1 ™ (lb/bbl) | 1 | 0.875 | 0.75 | 0.5 | 0.25 |
| SAP (lb/bbl) | 1 | 0.875 | 0.75 | 0.5 | 0.25 |
| 600 rpm | 87 | 75 | 70 | 45 | 19 |
| 300 rpm | 51 | 43 | 41 | 25 | 12 |
| 200 rpm | 42 | 28 | 33 | 19 | 9 |
| 100 rpm | 31 | 17 | 20 | 12 | 5 |
| 6 rpm | 8 | 5 | 6 | 3 | 2 |
| 3 rpm | 7 | 4 | 4 | 2 | 1 |

TABLE 2-continued

| Drilling Fluid # | 1 | 2 | 3 | 4 | 5 |
|---|---|---|---|---|---|
| Apparent Viscosity (cP) | 44 | 38 | 35 | 23 | 10 |
| Plastic Viscosity (cP) | 36 | 32 | 29 | 20 | 7 |
| Yield Point (lb/100 ft²) | 15 | 11 | 12 | 5 | 5 |
| 10 s. Gel Strength (lb/100 ft²) | 9 | 6 | 6 | 3 | 2 |
| 10 min. Gel Strength (lb/100 ft²) | 17 | 11 | 11 | 7 | 3 |
| API Fluid Loss (mL) | 12 | 13 | 14 | 16 | 21 |

Table 3 shows the effect of different types of aqueous liquids as the base fluid on the swelling capability of the superabsorbent polymer and the fluid properties of 4 different drilling fluids. The drilling fluids contained: POLY-BORE™ high molecular weight partially-hydrolyzed polyacrylamide viscosifier and shale stabilizer at a concentration of 0.42 lb/bbl (1.6 kg/m³); hydroxyethyl cellulose "HEC" at a concentration of 1.25 lb/bbl (4.8 kg/m³); SSA-1™ silica particles at a concentration of 1 lb/bbl (3.9 kg/m³); and the SAP at a concentration of 1 lb/bbl (3.9 kg/m³), along with various types of aqueous liquids as the base fluid.

As can be seen in Table 3, the increased presence of valence cations in the base fluid has a direct negative impact on the fluid's properties and fluid loss control. For example, a sea salt solution as the base fluid provides a substantial decrease in viscosities and an API fluid loss of 49 mL/30 min. compared to higher viscosities and an API fluid loss of only 12 mL/30 min. for deionized water or similar results for tap water. This indicates that the presence of salt or other compounds that present valence cations adversely affects the performance of the drilling fluid and the fluid loss additive package. Accordingly, the base fluid is preferably freshwater and does not include a water-soluble salt.

TABLE 3

| Drilling Fluid # | 1 | 2 | 3 | 4 |
|---|---|---|---|---|
| Deionized Water (mL) | 350 | — | 350 | 350 |
| Tap Water (mL) | — | 350 | — | — |
| Soda Ash (lb/bbl) | — | 0.1 | — | — |
| Gypsum (lb/bbl) | — | — | 1 | — |
| Sea Salt (lb/bbl) | — | — | — | 14.7 |
| 600 rpm | 87 | 60 | 23 | 17 |
| 300 rpm | 51 | 35 | 12 | 8 |
| 200 rpm | 42 | 23 | 9 | 5 |
| 100 rpm | 31 | 14 | 5 | 3 |
| 6 rpm | 8 | 3 | 1 | 1 |
| 3 rpm | 7 | 3 | 1 | 1 |
| Apparent Viscosity (cP) | 44 | 30 | 12 | 9 |
| Plastic Viscosity (cP) | 36 | 25 | 11 | 9 |
| Yield Point (lb/100 ft²) | 15 | 10 | 1 | 0 |
| 10 s. Gel Strength (lb/100 ft²) | 9 | 4 | 2 | 1 |
| 10 min. Gel Strength (lb/100 ft²) | 17 | 6 | 3 | 1 |
| API Fluid Loss (mL) | 12 | 13 | 26 | 49 |

Table 4 lists the ingredients and concentrations for 4 different drilling fluids used for the data in FIGS. 2-5. The drilling fluids contained at least some of the following ingredients: water; POLY-BORE™ high molecular weight partially-hydrolyzed polyacrylamide viscosifier and shale stabilizer; hydroxyethyl cellulose "HEC"; SSA-1™ silica particles; cross-linked sodium polyacrylate as the superabsorbent polymer "SAP" having a particle size of less than about 44 µm; PAC™-R modified natural cellulose polymer; or AQUAGEL® finely ground Wyoming sodium bentonite clay. The control fluid used cellulose as the fluid loss additive. Fluid #1 used hydroxyethyl cellulose "HEC" and SSA-1™ silica particles as the fluid loss additives without any superabsorbent polymer "SAP." Fluid #2 had the fluid loss additive package of the HEC, SAP, and silica particles. Fluid #3 used bentonite clay and cellulose as the fluid loss additives.

TABLE 4

| Ingredient | CTL Fluid | Fluid #1 | Fluid #2 | Fluid #3 |
|---|---|---|---|---|
| Deionized Water (mL) | 350 | 350 | 350 | 350 |
| POLY-BORE ™ (lb/bbl) | 0.42 | 0.42 | 0.42 | — |
| HEC (lb/bbl) | — | 1.25 | 1.25 | — |
| SSA-1 ™ (lb/bbl) | — | 1 | 1 | — |
| SAP (lb/bbl) | — | — | 1 | — |
| PAC ™-R | 0.42 | — | — | 0.25 |
| AQUAGEL ® | — | — | — | 14.7 |

Figure 2:
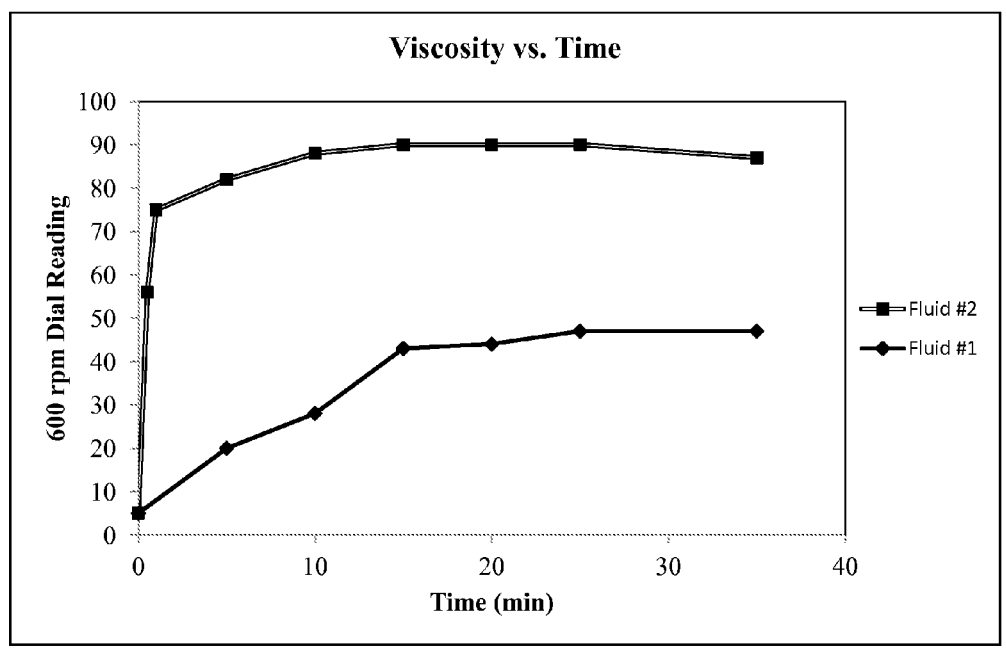
FIG. 2 is a graph of viscosity versus time for two different fluids according to certain embodiments.

FIG. 2 is a graph of viscosity as the 600 rpm dial reading from the rheology versus time in minutes for Fluid #1 and Fluid #2. As can be seen, Fluid #2, having the SAP, exhibited a much higher viscosity and developed viscosity much faster than Fluid #1 that did not have the SAP. This indicates that the SAP can swell quickly and impart viscosity and suspending capabilities to a fluid.

Figure 3:
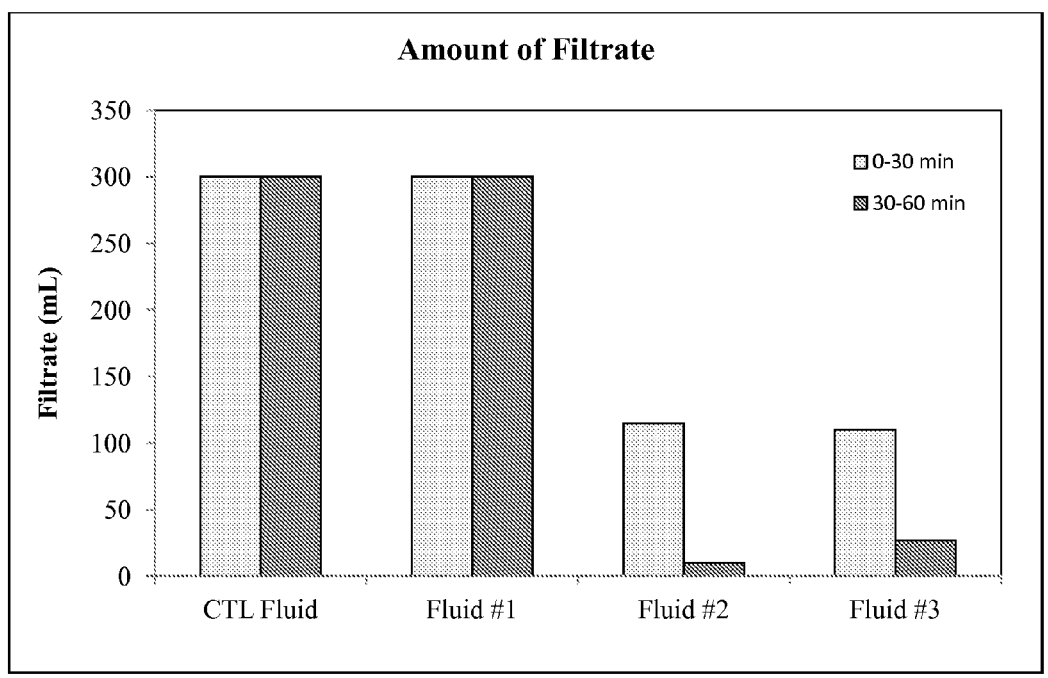
FIG. 3 is a graph of the amount of filtrate in milliliters for four different fluids at times of 0-30 minutes and 30-60 minutes.

FIG. 3 is a graph of fluid loss in amount of filtrate (milliliters) for the 4 fluids. Fluid loss was conducted on 50/70 mesh sand as the filter and a pressure differential of 100 psi. As can be seen, the Ctl fluid and Fluid #1 that did not contain the SAP exhibited very poor fluid loss of about 300 mL of fluid lost in 30 minutes and 60 minutes. Fluid #2, having the SAP, exhibited a much lower fluid loss, especially at 60 min. compared to the Ctl fluid and Fluid #1. Moreover, the fluid loss for Fluid #2 with the SAP at a time of 60 min was much lower than the fluid loss at 30 min. This indicates that the SAP particles should be fully hydrated in order to function effectively as a fluid loss additive. As such, additional hydration time may be used to ensure desirable fluid loss values in the wellbore. Additionally, Fluid #2 exhibited comparable fluid loss at 30 min and improved fluid loss at 60 min compared to Fluid #3, a traditional bentonite clay fluid. This indicates that the fluid loss additive package including the SAP functions as well if not better than bentonite clay to inhibit fluid loss into a formation.

Figure 4:
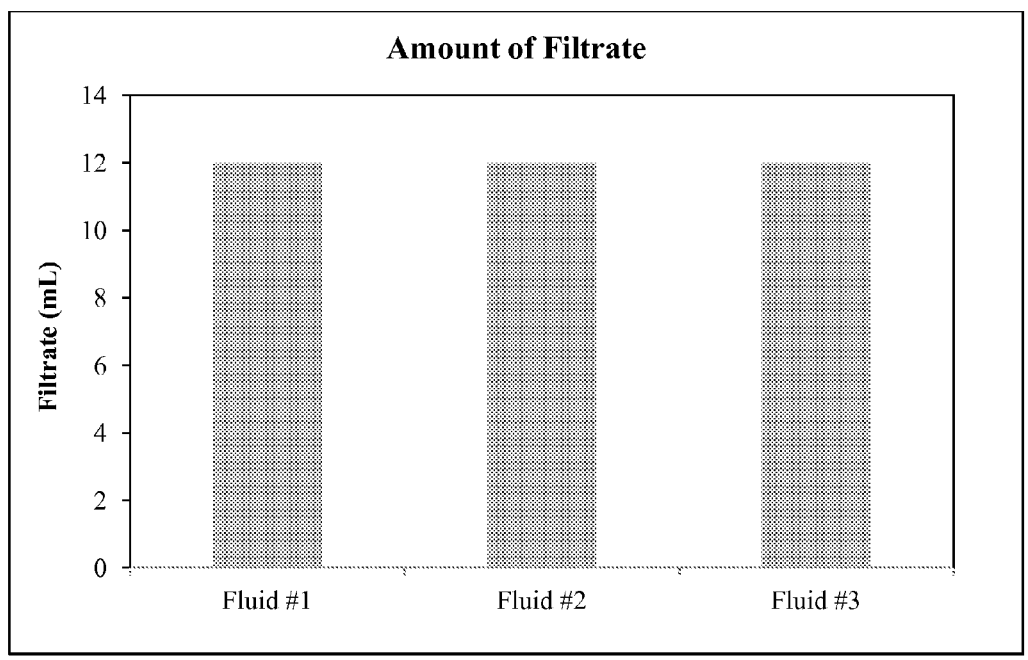
FIG. 4 is a graph of the amount of filtrate in milliliters for three different fluids using a small pore filter.

FIG. 4 is a graph of API fluid loss in amount of filtrate (mL) in 30 min for Fluid #1, Fluid #2, and Fluid #3. API fluid loss was performed using a hardened porous filter paper and a pressure differential of 100 psi. API fluid loss was performed to test the performance of the drilling fluids on smaller subterranean formation pore sizes. As can be seen, all 3 of the fluids exhibited the same fluid loss of less than 15 mL in 30 min. This indicates that the derivatized cellulose and silica particles work effectively in tandem to provide low fluid loss for smaller pore sizes. This also indicates that the derivatized cellulose and silica work as well as other types of cellulose and/or bentonite clay.

Figure 5:
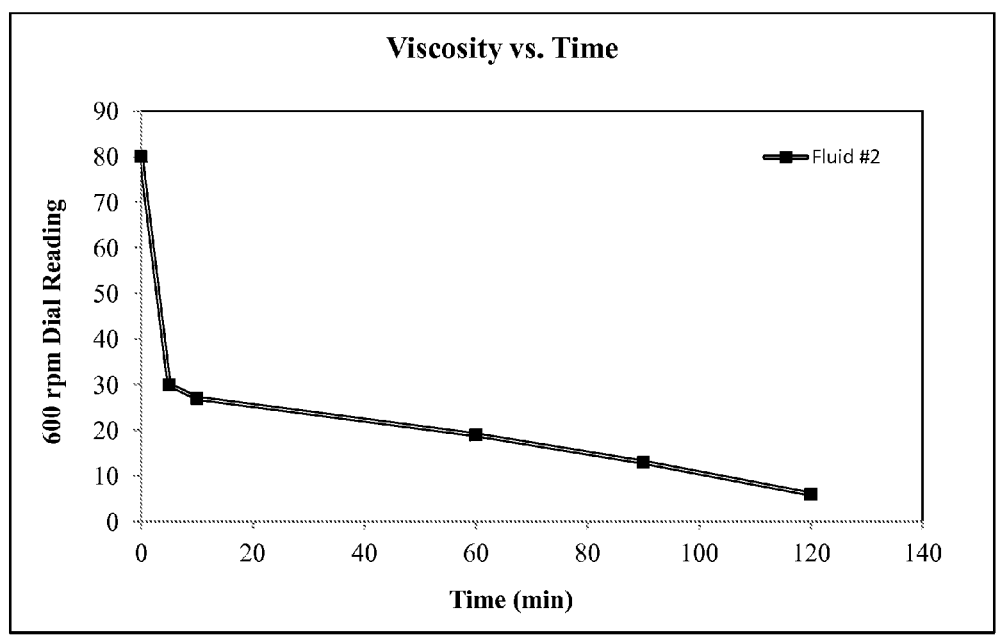
FIG. 5 is a graph of viscosity versus time for a fluid showing breakdown of a filtercake.

FIG. 5 is a graph of viscosity as the 600 rpm dial reading from the rheology versus time in minutes for Fluid #2 after being contacted with a 2% by volume sodium hypochlorite solution as a breaker. As can be seen, after contact with the breaker, the viscosity of the drilling fluid decreased substantially in a very short amount of time. This indicates that the drilling fluid with the fluid loss additive package can be broken and flowed from the wellbore after its function is no longer needed.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of drilling a wellbore into a subterranean formation comprising:
    providing a drilling fluid, the drilling fluid comprising:
        (A) a base fluid; and
        (B) a fluid loss additive package, the fluid loss additive package comprising:
            (i) a water-swellable, superabsorbent polymer;
            (ii) a derivatized cellulose; and
            (iii) non-swellable particles that are insoluble in the base fluid;
    hydrating the water-swellable, super-absorbent polymer; and
    then forming the wellbore using a drill bit and the drilling fluid.

2. The method according to claim 1, wherein the base fluid comprises water.

3. The method according to claim 2, wherein the water is selected from the group consisting of freshwater and brackish water.

4. The method according to claim 1, wherein the base fluid and the drilling fluid do not include a water-soluble salt and the base fluid is not a brine.

5. The method according to claim 1, wherein the wellbore is for a shallow well.

6. The method according to claim 5, wherein the water-swellable, superabsorbent polymer and the non-swellable particles are not biodegradable.

7. The method according to claim 1, wherein the superabsorbent polymer is in the form of particles prior to the hydrating, and wherein at least 90% of the superabsorbent polymer particles have a particle size less than about 75 pm prior to the hydrating.

8. The method according to claim 1, wherein the molecules of the superabsorbent polymer form a polymer network due to cross-linking of the molecules of the superabsorbent polymer.

9. The method according to claim 1, wherein the superabsorbent polymer is in a concentration in the range of about 0.2 to about 5 pounds per barrel of the drilling fluid.

10. The method according to claim 1, wherein the superabsorbent polymer is selected from: a cross-linked homopolymer of acrylic acid or acrylate, acrylamide, ethylene, maleic anhydride, methacrylic acid, vinyl acetate, vinyl alcohol, acrylonitrile, hydroxyethylmethacrylate, carboxymethylcellulose, ethylene oxide, propylene oxide, vinylpyrrolidone, or styrenesulfonate; and copolymers of any of the foregoing.

11. The method according to claim 1, wherein the derivatized cellulose is selected from hydroxyethyl cellulose, alkyl hydroxyethyl cellulose, cellulose derivatized with alkyl ethers, and cellulose derivatized with polyethylene glycol or propylene glycol substituents attached to the cellulose backbone.

12. The method according to claim 1, wherein the derivatized cellulose and the particles are in a concentration in the range of about 0.5 to about 5 pounds per barrel of the drilling fluid.

13. The method according to claim 1, wherein the particles are bulk particles, mesoscopic particles, or combinations thereof.

14. The method according to claim 1, wherein the particles are selected from the group consisting of silica particles, alumina particles, glass micro-particles and microspheres, ceramic micro-particles and microspheres, sized calcium carbonate, and combinations thereof.

15. The method according to claim 1, wherein the drilling fluid does not contain a clay.

16. The method according to claim 1, wherein the drilling fluid has an API fluid loss less than 30 milliliters in 30 minutes at a pressure differential of 100 pounds force per square inch.

17. The method according to claim 1, wherein the drilling fluid is mixed with mixing equipment.

18. A system comprising:
    a wellbore that penetrates a subterranean formation; and
    a drilling fluid that forms the wellbore, wherein the drilling fluid comprises:
        (A) a base fluid; and
        (B) a fluid loss additive package, the fluid loss additive package comprising:
            (i) a hydrated water-swellable, superabsorbent polymer: wherein the water-swellable, superabsorbent polymer is hydrated prior to use of the drilling fluid to form the wellbore;
            (ii) a derivatized cellulose; and
            (iii) non-swellable particles that are insoluble in the base fluid.

19. The system according to claim 18, wherein the wellbore is for a shallow well.

20. The system according to claim 19, wherein the water-swellable, superabsorbent polymer and the non-swellable particles are not biodegradable.

* * * * *